(12) United States Patent
Caprioli (10) Patent No.: US 8,161,273 B2
(45) Date of Patent: Apr. 17, 2012

(54) METHOD AND APPARATUS FOR PROGRAMMATICALLY REWINDING A REGISTER INSIDE A TRANSACTION

(75) Inventor: Paul Caprioli, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 362 days.

(21) Appl. No.: 12/037,636

(22) Filed: Feb. 26, 2008

(65) Prior Publication Data

US 2009/0217013 A1 Aug. 27, 2009

(51) Int. Cl.
*G06F 9/308* (2006.01)
*G06F 9/312* (2006.01)
(52) U.S. Cl. ............................ 712/228; 712/225
(58) Field of Classification Search .................. 712/228, 712/225
See application file for complete search history.

(56) References Cited

U.S. PATENT DOCUMENTS

| 5,414,864 | A | * | 5/1995 | Koizumi | 712/228 |
| 5,729,724 | A | * | 3/1998 | Sharangpani et al. | 712/222 |
| 5,822,787 | A | * | 10/1998 | Zucker | 711/213 |
| 6,145,049 | A | * | 11/2000 | Wong | 710/267 |
| 7,171,547 | B1 | * | 1/2007 | Thangadurai et al. | 712/228 |
| 7,216,216 | B1 | * | 5/2007 | Olson et al. | 712/220 |

* cited by examiner

*Primary Examiner* — Daniel Pan
(74) *Attorney, Agent, or Firm* — Park, Vaughan, Fleming & Dowler LLP; Anthony Jones (57) ABSTRACT

Embodiments of the present invention provide a system that allocates registers in a processor. The system starts by commencing a transaction, wherein commencing the transaction involves preserving a pre-transactional state of registers in a first register file. The system then allocates one or more registers for temporary use during the transaction. Upon finishing using each allocated register during the transaction, the system executes an instruction that restores the allocated register to the pre-transactional state.

23 Claims, 5 Drawing Sheets

| | | | |
|---|---|---|---|
| | %I7 | %R31 | RETURN ADDRESS |
| | %I6 %FP | %R30 | FRAME POINTER |
| IN | %I5 | %R29 | INCOMING PARAMETER[5] |
| | ... | ... | ... |
| | %I0 | %R24 | INCOMING PARAMETER[0] |
| | %L7 | %R23 | LOCAL[7] |
| LOCAL | ... | ... | ... |
| | %L0 | %R16 | LOCAL[0] |
| | %O7 | %R15 | ADDRESS OF CALL INSTR. |
| | %O6 %SP | %R14 | STACK POINTER |
| OUT | %O5 | %R13 | OUTGOING PARAMETER[6] |
| | ... | ... | ... |
| | %O0 | %R8 | OUTGOING PARAMETER[0] |
| | %G7 | %R7 | GLOBAL[7] |
| GLOBAL | ... | ... | ... |
| | %G1 | %R1 | TEMPORARY VALUE |
| | %G0 | %R0 | 0 |

METHOD AND APPARATUS FOR PROGRAMMATICALLY REWINDING A REGISTER INSIDE A TRANSACTION

BACKGROUND

1. Field of the Invention

Embodiments of the present invention relate to techniques for allocating processor registers during computational operations. More specifically, embodiments of the present invention relate to a technique for programmatically rewinding a register inside a transaction.

2. Related Art

Virtually all processors include a register file that contains registers which are used to store data. In many systems, the register file is divided into a number of general-purpose registers, which the processor uses to hold computational data, and special-purpose registers, which the processor uses to hold values such as a stack pointer or a frame pointer.

In addition, some processors support "register windowing," wherein a register file is logically divided into a number of "register windows" each of which includes a set of the registers. For example, the SPARC™ architecture (from SPARC International, Campbell, Calif., USA) includes a large register file that is logically divided into a set of "global" registers that are visible in all register windows and a number of sets of "overlapping" register windows. Each of these overlapping register windows includes a set of "local" registers, and also shares a set of "in" registers with one adjacent register window, and shares a set of "out" registers with another adjacent register window.

Figure 1:
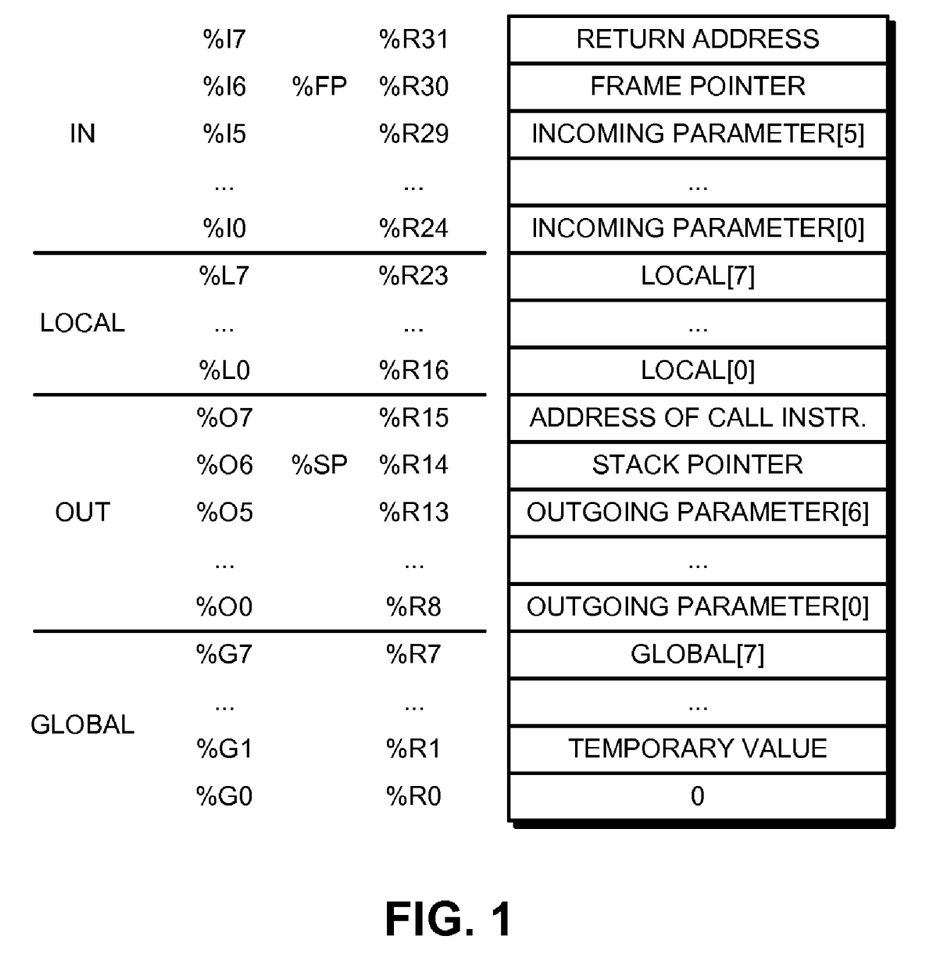
FIG. 1 presents a block diagram illustrating a SPARC register window.

More specifically, FIG. 1 presents a block diagram illustrating a SPARC register window. As shown in FIG. 1, there are a number of special-purpose registers in the register window, including % R30 which holds the frame pointer and % R14 which holds the stack pointer. The remaining registers in the register window are general-purpose registers for storing procedure arguments, local values, and return addresses. As described above, the register window includes "in," "local," and "out" registers. For a complete description of SPARC register windows, see David Weaver and Tom Germond, *The SPARC Architecture Manual*, version 9, pp. 29-34 and 301-305, PTR Prentice Hall, Englewood Cliffs, N.J.

Unfortunately, certain instructions, functions, or procedures (collectively, "procedures") require more registers than are available in a register window. When a procedure has used all the allocatable registers in a given window, the processor either: (1) stores some registers in memory to free up the registers for the procedure, or (2) changes the current register window and starts using another register window for the procedure. In either case, the overhead of storing individual registers or changing register windows can degrade processor performance.

Some processors also include a floating-point register file that contains a number of registers that are used to store floating-point data. For example, the SPARC architecture includes a floating-point register file. However, in many systems, the floating-point register file does not support register windowing. Hence, if a procedure uses all of the floating-point registers, the processor starts storing the data in some of the floating-point registers to memory to free up floating-point registers for the procedure. When the stored data is subsequently required, the processor must load the data from memory to the floating-point register. Note that store and load operations are significantly slower than a register access. Consequently, floating-point procedures which cause registers to be stored can suffer performance degradation.

Hence, what is needed is a processor without the above-described problems.

SUMMARY

Embodiments of the present invention provide a system that allocates registers in a processor. The system starts by commencing a transaction, wherein commencing the transaction involves preserving a pre-transactional state of registers in a first register file. The system then allocates one or more registers for temporary use during the transaction. Upon finishing using each allocated register during the transaction, the system executes an instruction that restores the allocated register to the pre-transactional state.

In some embodiments, allocating a register involves allocating an integer register. In these embodiments, executing the instruction that restores the allocated register to the pre-transactional state involves executing a REWIND instruction.

In some embodiments, allocating a register involves allocating a floating-point register. In these embodiments, executing the instruction that restores the allocated register to the pre-transactional state involves executing a FREWIND instruction.

In some embodiments, preserving the pre-transactional state of the registers in the first register file involves copying the data from the registers in the first register file to corresponding registers in a second register file and using the registers in the first register file during the transaction. In these embodiments, restoring an allocated register involves copying the data for the allocated register from the second register file to the first register file.

In some embodiments, preserving the pre-transactional state of the set of registers in the register file involves switching to a second register file as the transaction commences and subsequently using the second register file during the transaction. In these embodiments, the system asserts a modified bit for each register in the second register file which is written to during the transaction. Upon completing the transaction, the system sets an architectural register indicator associated with each register which has a modified bit set so that the register is used as an architectural copy of the register during subsequent execution. In these embodiments, restoring an allocated register involves clearing the modified bit for the register.

In some embodiments, the registers that are to be restored to the pre-transactional state include at least one special-purpose register or general-purpose register.

Embodiments of the present invention provide an instruction that when executed causes a processor to restore preserved pre-transactional data to a register during a transaction. In these embodiments, the register can be a special-purpose or general-purpose register that is to be used during the transaction, but is to be restored to a pre-transactional state before the transaction completes.

In some embodiments, the register is a non-floating-point register and the instruction is a REWIND instruction.

In some embodiments, the register is a floating-point register and the instruction is a FREWIND instruction.

In some embodiments, the instruction includes an opcode and a register identifier, wherein the opcode specifies the type of the instruction and the register identifier identifies the register that the instruction causes the processor to restore.

DETAILED DESCRIPTION

The following description is presented to enable any person skilled in the art to make and use embodiments of the present invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The instructions described in this detailed description (e.g., REWIND, FREWIND) can be stored on a computer-readable storage medium, which may be any device or medium that can store instructions for use by a computer system. When a computer system reads and executes the instructions stored on the computer-readable storage medium, the computer system performs the methods described in this detailed description. Note that non-statutory computer-readable storage mediums (e.g., transitory signals) are not included in the computer-readable storage medium.

Terminology

In the following sections, we describe embodiments of the present invention using "transactions" as an exemplary usage context. However, any time that the processor includes a copy of a given register, embodiments of the present invention can facilitate temporarily using the register to store data and then restoring the register to the copied value. For example, any checkpoint-commit region, which is defined by a checkpoint being taken at the beginning of the region, followed by a commit operation, presents a situation where a restore operation can be used.

Hence, we use the term "transactions" throughout the disclosure and in the claims to describe sections of program code where original data for one or more registers has been preserved or checkpointed. In addition, we use the term "transactional execution" to describe the execution of program code within a transaction, and we use the term "pre-transactional state" to describe the preserved data.

Overview

Embodiments of the present invention provide REWIND and FREWIND instructions. When executed by a processor during transactional execution, these instructions restore (or "rewind") a processor register to a pre-transactional state.

In these embodiments, as a transaction starts, a checkpoint is generated to enable a recovery to a pre-transactional state in the event that the transaction fails. As part of generating a checkpoint, the pre-transactional data in the processor registers is saved to a backing store or a shadow register. Because the pre-transactional data has been saved, these embodiments can temporarily use registers during the transaction that may otherwise be unavailable and can use REWIND and/or FREWIND instructions to restore the pre-transactional value to the register before the transaction has completed.

The REWIND and FREWIND instructions take a register identifier and restore the identified register to its pre-transactional state. More specifically, the REWIND instruction restores integer registers, while the FREWIND instruction restores floating-point registers.

Because the registers are restored before the transaction completes, embodiments of the present invention can use registers whose usage is ordinarily disallowed by convention (e.g., according to the application binary interface ("ABI") or another hardware or software convention). These embodiments: (1) use such registers during the transaction, and (2) use registers that are not concurrently being used for their conventional purpose (e.g., as the stack pointer).

By using processor registers in this way, embodiments of the present invention effectively overcome the limitations on the number of available registers within the register file. Hence, these embodiments can eliminate the need to save and restore register values by performing stores and loads, or register window saves and restores, which can degrade processor performance.

Transactional Execution

Embodiments of the present invention enable several threads to access shared memory simultaneously. For example, two or more threads within a given processor can access the same L1 cache 204 (see FIG. 2). Alternatively, one or more threads from two or more processors 202 can access L2 cache 206. Because memory accesses by one thread can interfere with memory accesses by another thread, embodiments of the present invention include transactional execution mechanisms to ensure that different threads do not interfere with each other while accessing shared memory.

At the start of transactional execution, the system checkpoints the architectural state of the processor (i.e., saves the pre-transactional state of the processor to enable a recovery to the pre-transactional state in the event that the transaction fails) and executes a section of code which is designated as "transactional" under the condition that the memory locations accessed by the section of code must not be interfered with by other threads while the transaction is executing. If another thread interferes with such a memory location, the transaction aborts, the checkpoint is restored, and the transaction can be re-executed (or error-handling can be performed). For a more detailed explanation of transactional execution, see U.S. Pat. No. 6,862,664, entitled "Method and Apparatus for Avoiding Locks by Speculatively Executing Critical Sections" by inventors Shailender Chaudhry, Marc Tremblay and Quinn A. Jacobson.

Embodiments of the present invention use a load-mark and store-mark entry in metadata associated with each cache line to facilitate transactional execution. Note that in these embodiments: (1) a transactionally executing processor (or thread) places a load-mark on all lines read in a transaction, (2) the processor (or thread) places a store-mark on all lines written in the transaction, (3) these load-marks and store-marks are all held simultaneously when the transaction commits, (4) all loads that precede the transaction in program order are either committed prior to the transaction commit or have a load-mark on the cache line when the transaction commits, and (5) all stores that precede the transaction in program order are either committed prior to the transaction commit or have a store-mark on the cache line when the transaction commits. These rules guarantee that all reads and writes within the transaction can be placed (in program order)

in the memory order when the transaction commits, without any intervening memory accesses from any other processors (or threads), thus preserving transactional semantics. Specifically, when the transaction commits, all earlier (in program order) loads for which load-marks are held are committed, all earlier (in program order) stores for which store-marks are held are committed, and then all loads and stores within the transaction are committed.

Embodiments of the present invention also use these mechanisms to implement individual instructions (such as read-modify-write) or short sequences of instructions by executing these instructions as a short transaction.

Computer System

Figure 2:
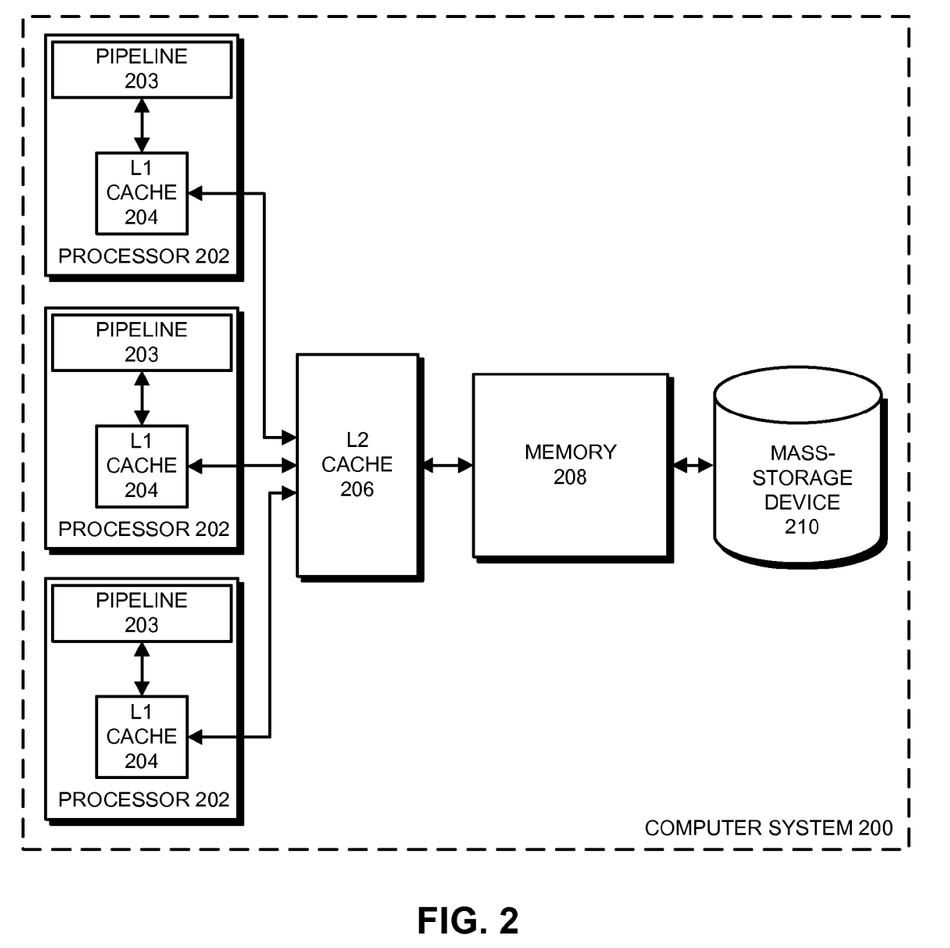
FIG. 2 presents a block diagram of a computer system in accordance with embodiments of the present invention.

FIG. 2 presents a block diagram of a computer system 200 in accordance with embodiments of the present invention. Computer system 200 includes several processors 202, L2 cache 206, memory 208, and mass-storage device 210.

Each processor 202 is a general-purpose processor that performs computational operations. For example, each processor 202 can be a central processing unit (CPU) such as a microprocessor. On the other hand, each processor 202 can be a controller or an application-specific integrated circuit.

Each processor 202 includes pipeline 203 that executes instructions to perform computational operations. In addition, each processor 202 includes L1 cache 204. In some embodiments of the present invention, one or more processors 202 are multi-threaded. Multi-threaded processors are well known in the art and hence are not described in more detail.

Mass-storage device 210, memory 208, L2 cache 206, and L1 cache 204 collectively form a memory hierarchy that stores data and instructions for the processors 202. Generally, mass-storage device 210 is a high-capacity memory, such as a disk drive or a large flash memory, with a large access time, while L1 cache 204, L2 cache 206, and memory 208 are smaller, faster semiconductor memories that store copies of frequently used data. Memory 208 is typically a dynamic random access memory (DRAM) structure that is larger than L1 cache 204 and L2 cache 206, whereas L1 cache 204 and L2 cache 206 are typically comprised of smaller static random access memories (SRAM). Note that some or all of the cache lines in the L1 caches 204, L2 cache 206, and memory 208 include load-marks and store-marks in metadata associated with the cache lines and transactional execution mechanisms for facilitating transactional execution.

Although we use specific components to describe computer system 200, in alternative embodiments different components can be present in computer system 200. For example, computer system 200 can include video cards, network cards, optical drives, and/or other peripheral devices that are coupled to the processors 202 using a bus, a network, or another suitable communication channel. In addition, each processor 202 may include one or more additional pipelines.

Computer system 200 can be used in many different types of electronic devices. For example, computer system 200 can be part of a desktop computer, a laptop computer, a server, a media player, an appliance, a cellular phone, a piece of testing equipment, a network appliance, a calculator, a personal digital assistant (PDA), a hybrid device (i.e., a "smart phone"), a guidance system, an automotive control system, or another electronic device.

Pipeline

Figure 3:
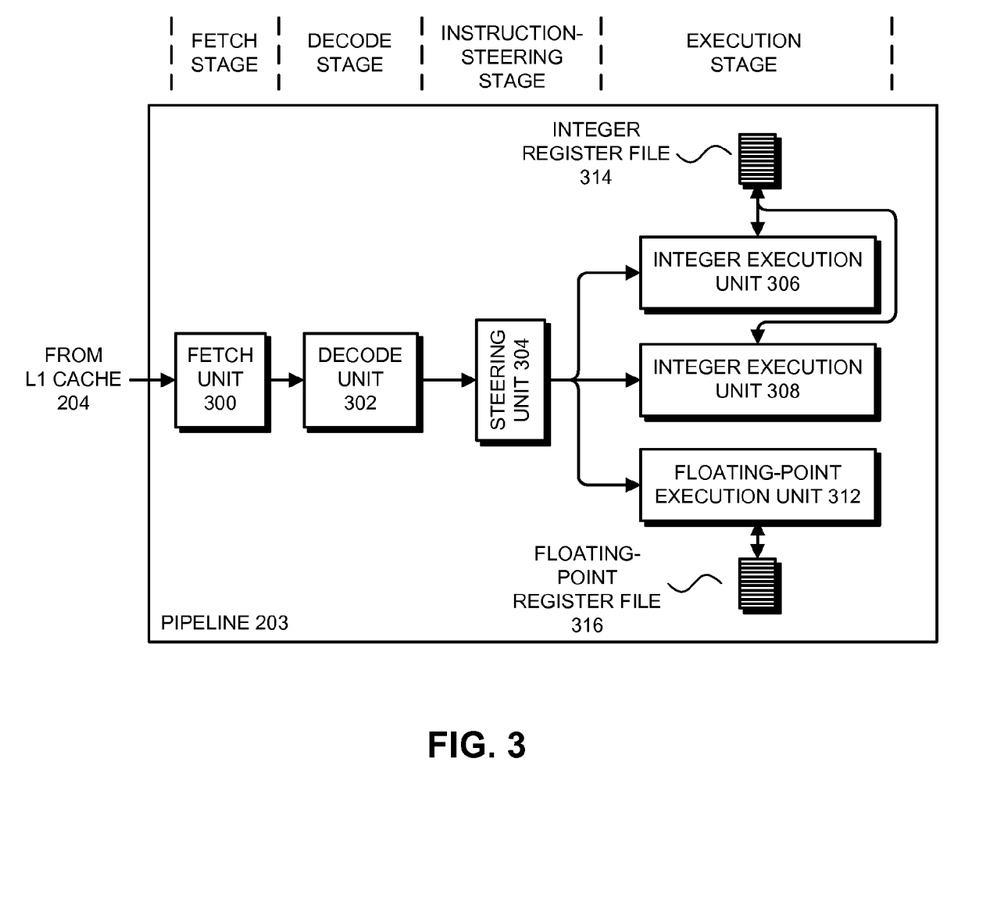
FIG. 3 presents a block diagram of a pipeline in accordance with embodiments of the present invention.

FIG. 3 presents a block diagram of a pipeline 203 (see FIG. 2) in accordance with embodiments of the present invention. Pipeline 203 includes several functional units: fetch unit 300, decode unit 302, steering unit 304, integer execution units 306 and 308, and floating-point execution unit 312.

Integer execution units 306 and 308 are coupled to integer register file 314, while floating-point execution unit 312 is coupled to floating-point register file 316. Register files 314 and 316 include a number of register circuits that the associated execution units use to store computational data and/or control data.

Functional units in pipeline 203 are logically divided into a number of stages according to the operations that the units perform. These stages include a fetch stage, a decode stage, an instruction-steering stage, and an execution stage.

In the fetch stage, fetch unit 300 fetches instructions and data from L1 cache 204 and forwards these instructions into the decode stage. (Note that some embodiments of the present invention include a separate instruction cache and data cache.) In the decode stage, decode unit 302 prepares the fetched instructions and data for execution in the execution stage. In the instruction-steering stage, steering unit 304 determines the appropriate execution unit for executing each instruction and forwards each instruction to that execution unit. For example, steering unit 304 forwards integer operations to an integer execution unit (e.g., integer execution unit 306).

In the execution stage, the instructions are executed in the appropriate unit. More specifically, integer instructions are executed in integer execution unit 306 or 308, while floating-point instructions are executed in floating-point execution unit 312. While executing instructions, integer execution units 306 and 308 use integer register file 314 to store integer computational data and control data. On the other hand, floating-point execution unit 312 uses floating-point register file 316 to store computational data.

Note that pipeline 203 is a simplified version of a more-complicated execution pipeline that is present in some embodiments of the present invention. In these embodiments, pipeline 203 includes additional stages and/or sub-stages where a wide variety of operations are performed in addition to the basic operations described above. For example, the execution stage can include one or more register read stages, wherein an architectural register file and a working register file are read to provide operands from one or more processor registers.

In some embodiments of the present invention, pipeline 203 includes stages before, in parallel with, and/or after the stages shown in FIG. 2. For example, in these embodiments, pipeline 203 can include an address generation stage and/or a prefetch stage before the fetch stage. In addition, in these embodiments, a memory write stage, cache access stage, and/or trap stage occur within or after the execution stage.

Register Files

Integer Register File

In embodiments of the present invention, integer register file 314 is logically divided into a number of general-purpose registers, which are used to hold computational data, and special-purpose registers, which are used to hold control data. For example, the computational data can include input operands, intermediate results, or output operands, while the control data can include a stack pointer, a return address, or a frame pointer.

Some embodiments of the present invention also support "register windowing," which further logically divides the integer register file into a number of "register windows" each of which includes a subset of the registers. Register windowing is known in the art and hence is not described in more detail.

Note that alternative embodiments without special-purpose and/or general-purpose registers and/or that do not support register windowing work using the same principles.

Floating-Point Register File

In embodiments of the present invention, floating-point register file 316 includes a number of general-purpose registers which are used to hold computational data such as input operands, intermediate results, and output operands. However, in some embodiments, floating-point register 316 does not include special-purpose registers. In addition, some embodiments do not support register windowing for the floating-point registers. Note that alternative embodiments that include special-purpose registers and/or support register windowing operate using the same principles.

Transactional Execution and the Register Files

In embodiments of the present invention, generating a checkpoint before commencing transactional execution involves saving the precise architectural state of the processor to enable recovery to the processor's pre-transactional state in the event that the transaction fails. For example, generating a checkpoint can involve preserving the data in the register files when the transaction commences ("pre-transactional data"), as well as preserving the program counter and stack pointer.

Figure 4:
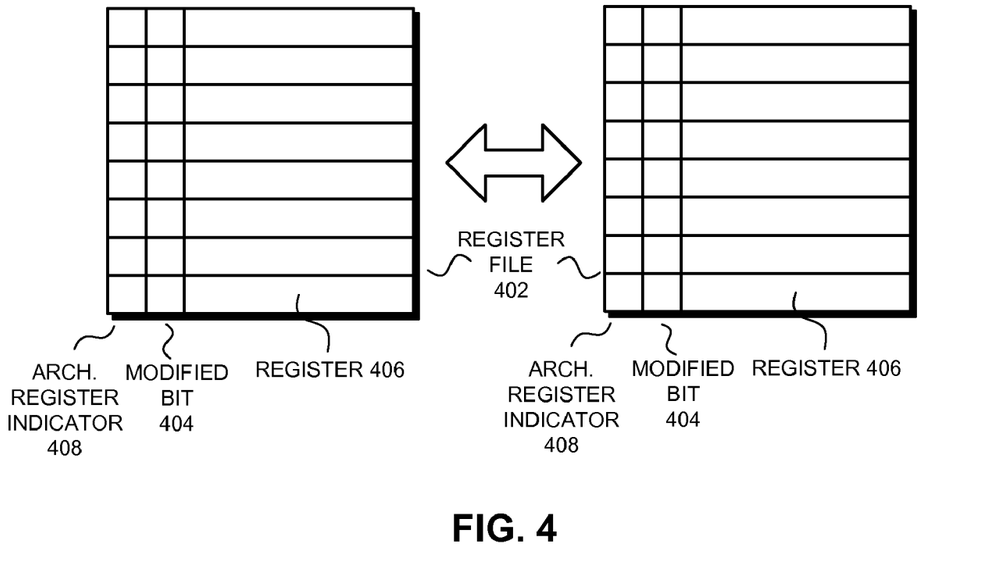
FIG. 4 presents a block diagram of register files in accordance with embodiments of the present invention.
Figure 5:
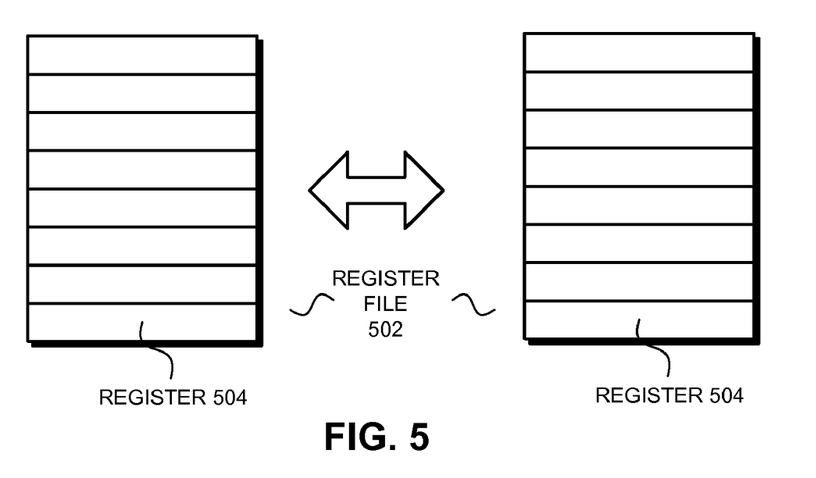
FIG. 5 presents a block diagram of register files in accordance with embodiments of the present invention.

In some embodiments of the present invention, preserving the pre-transactional data in the register file involves switching from an original copy of the register file to a second copy of the register file when commencing the transaction. In other embodiments of the present invention, preserving the pre-transactional data in the register file involves copying all the data from an original copy of the register file to a second copy of the register file when commencing the transaction. FIG. 4 and FIG. 5 present block diagrams of register files for preserving pre-transactional data in accordance with embodiments of the present invention.

Switching to a Second Register File During a Transaction

In the embodiments of the present invention that switch from an original copy of the register file to a second copy as the transaction commences, the processor writes transactional data to the second copy of the register file during the transaction, thereby preventing the pre-transactional data in the original copy of the register file from being overwritten by transactional data. Pre-transactional data for a given register is read from the original copy of the register file (i.e., as input data for executing instructions) during the transaction until transactional data is written into the register in the second copy of the register file. After transactional data is written to the register, data is subsequently read from the second copy of the register file during the transaction.

In these embodiments, neither register file serves solely as a "transactional register file." Instead, the processor maintains an indicator for each register that indicates which copy of the register file holds the data that is safe to read during non-transactional execution for the register (i.e., the "architectural data"). When a transaction completes successfully, each affected indicator is updated to indicate the copy of the register file that was written during the transaction, thereby "promoting" that register to be the architectural copy of the register. If the transaction fails, the processor does not update the indicators, but instead leaves the indicators indicating the original registers. Note that this means that the architectural copy of each of the registers can be in either of the register files.

FIG. 4 presents a block diagram of register files used in the embodiments of the present invention that switch from an original copy of the register file 402 to a second copy of the register file 402 when generating a checkpoint. As shown in FIG. 4, each register 406 in each copy of the register file 402 includes a modified bit 404 and an architectural register indicator ("arch. register indicator") 408.

During a transaction, when a given register 406 has transactional data written to it, the associated modified bit 404 is set. If the transaction is successful, for each register 406 with the associated modified bit 404 set, processor 202 updates the architectural register indicator 408 for the register to indicate that the register is the architectural copy of the register. The processor 202 then clears all of the modified bits 404. On the other hand, if the transaction fails, the modified bits 404 are cleared without updating the architectural register indicators 408, thereby preserving the pre-transactional data in the original copy of the register.

Copying the Register File as a Transaction Commences

In embodiments of the present invention that copy all the data as a transaction commences, the data in each register in an original copy of the register file is copied to a corresponding register in a second copy of the register file. During the transaction, the processor uses the registers in the original register file in the same way as these registers are used during non-transactional (i.e., normal) execution. In other words, the processor freely stores transactional data to and reads data from the original register file.

In these embodiments, if a transaction is successful, the processor resumes non-transactional execution and continues to use the original register file (which was updated with any transactional values during the transaction). Otherwise, if a transaction fails, the processor replaces the entries in the original register file with the copies in the second copy of the register file, thereby returning the original register file to the pre-transactional state.

FIG. 5 presents a block diagram of register files used in the embodiments of the present invention that copy data from an original copy of a register file 502 to a second copy of the register file 502 when generating a checkpoint. As can be seen in FIG. 5, each register file 502 includes a number of registers 504. Unlike the register file in FIG. 4, the processor writes data to and reads data from one of the register files both during non-transactional and transactional execution. The other register file is used to store pre-transactional values in case a transaction fails and the processor must be restored to the pre-transactional state.

REWIND and FREWIND Instructions

Embodiments of the present invention provide REWIND and FREWIND instructions that, when executed by a processor during a transaction, cause the processor to restore data in a processor register from preserved data. For example, the processor can use the REWIND or FREWIND instructions to restore a processor register to a pre-transactional state during a transaction.

The REWIND instruction is used to restore non-floating-point registers, such as the registers in integer register file 314. Similarly, the FREWIND instruction is used to restore floating-point registers, such as the registers in floating-point register file 316.

Figure 6:
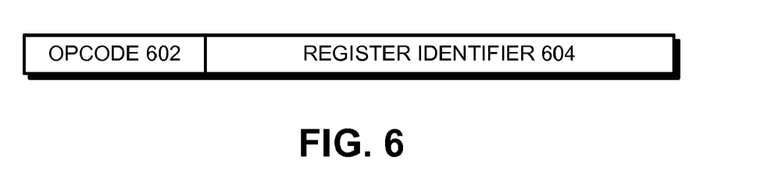
FIG. 6 presents an exemplary format for a REWIND or an FREWIND instruction in accordance with embodiments of the present invention.

FIG. 6 presents an exemplary format for a REWIND or an FREWIND instruction in accordance with embodiments of the present invention. As shown in FIG. 6, the instruction format includes opcode 602 and register identifier 604. Opcode 602 is a field that holds a specific machine-language code that causes a processor 202 to perform the operations necessary to execute the REWIND or FREWIND instructions. Register identifier 604 is a register address which indicates the register that is to be restored to the pre-transactional state. Although we present a particular format for the REWIND/FREWIND instruction, in alternative embodiments, these instructions are formatted differently. For example, in some embodiments, the instruction(s) includes one or more "control" fields that control the execution of the instruction. These control fields can include one or more flags that prevent the instruction from executing when certain conditions (e.g., traps, etc.) have occurred.

When executed, the REWIND instruction causes a processor 202 to restore a non-floating-point processor register to a pre-transactional state. In embodiments of the present invention where the pre-transactional state is copied to a second copy of the register file (see FIG. 5), executing a REWIND instruction causes the processor to copy the pre-transactional value from the second copy of the register file back to the original register file.

On the other hand, in embodiments of the present invention that use modified bit 404 to record when a register 406 has been written during a transaction (see FIG. 4), executing the REWIND instruction causes processor 202 to clear the modified bit 404 for the register. Because the modified bit 404 is cleared, processor 202 regards the register as unwritten during the transaction. Hence, unless a subsequent transactional write occurs and processor 202 sets modified bit 404 during the transaction, the system does not update the architectural register indictor 408 to indicate that the register is the architectural register upon successfully completing the transaction.

The FREWIND instruction causes a processor 202 to restore a register to a pre-transactional state in the same way as a REWIND instruction. However, as described above, the FREWIND instruction operates on floating-point registers.

In some embodiments of the present invention, using the REWIND and FREWIND instructions to restore registers facilitates allocating additional registers to instructions, functions, or procedures (collectively, "procedures") that use more registers than a register window or register file provides. Although there are numerous examples of such procedures, these procedures can include integer or floating-point mathematical operations such as computing the roots of polynomials or matrix multiplication, memory operations, such as memory copies that involve using processor registers, and regular-expression matches.

Using the REWIND or FREWIND Instruction

In some embodiments of the present invention, the REWIND or FREWIND instruction can be inserted in program code manually by a programmer. In alternative embodiments, a static or dynamic compiler, an optimizer, or another software tool can insert the REWIND or FREWIND instruction in the program code automatically as part of a compilation or optimization process. In some embodiments, an optimizer or another software tool automatically inserts REWIND or FREWIND instructions into already-existing program code (e.g., a binary file, bytecodes, etc.) to improve the performance of the existing program code.

In some embodiments of the present invention, a programmer, an optimizer, or a compiler may place a procedure in a transaction (i.e., may add a transaction where there was not one before) to enable the use of the REWIND and FREWIND instructions to provide access to additional registers while executing the procedure.

Transactional Failure and the REWIND and FREWIND Instructions

In embodiments of the present invention, a transaction may fail before processor 202 can execute the REWIND or FREWIND instruction to restore one or more registers to a pre-transactional state. Hence, the registers may contain transactional data from the failed transaction. Although the REWIND or FREWIND instruction is not executed to restore the data in the register, the data in the registers is not corrupted by the failure of the transaction because all of the pre-transactional values are automatically restored to the register file as part of handling the failure of the transaction.

Using Typically Unused Registers with REWIND and FREWIND

Because the REWIND and FREWIND instructions restore data in a given register to a pre-transactional state, embodiments of the present invention can use registers that are ordinarily unused during a transaction, thereby providing additional registers for the processor. By using these registers, the processor can avoid swapping register windows and/or storing (and subsequently loading) data from the registers to memory to make space within the register file for new data.

For example, some embodiments of the present invention may operate under the constraints of an application binary interface ("ABI") which identifies special-purpose (or reserved) registers within a register file (e.g., a stack pointer, a frame pointer, a thread identifier, or another special-purpose register). In these embodiments, the pre-transactional state of the special-purpose register is saved as the transaction commences. Hence, the special-purpose registers can be overwritten with transactional data during the transaction and a restoring instruction, such as a REWIND instruction, can be used to restore them to their pre-transactional state.

Note that in some embodiments of the present invention, register windowing is not supported for the floating-point register file. Hence, by providing additional floating-point registers during a transaction, the FREWIND instruction can significantly increase processor performance.

Process of Restoring a Register

Figure 7:
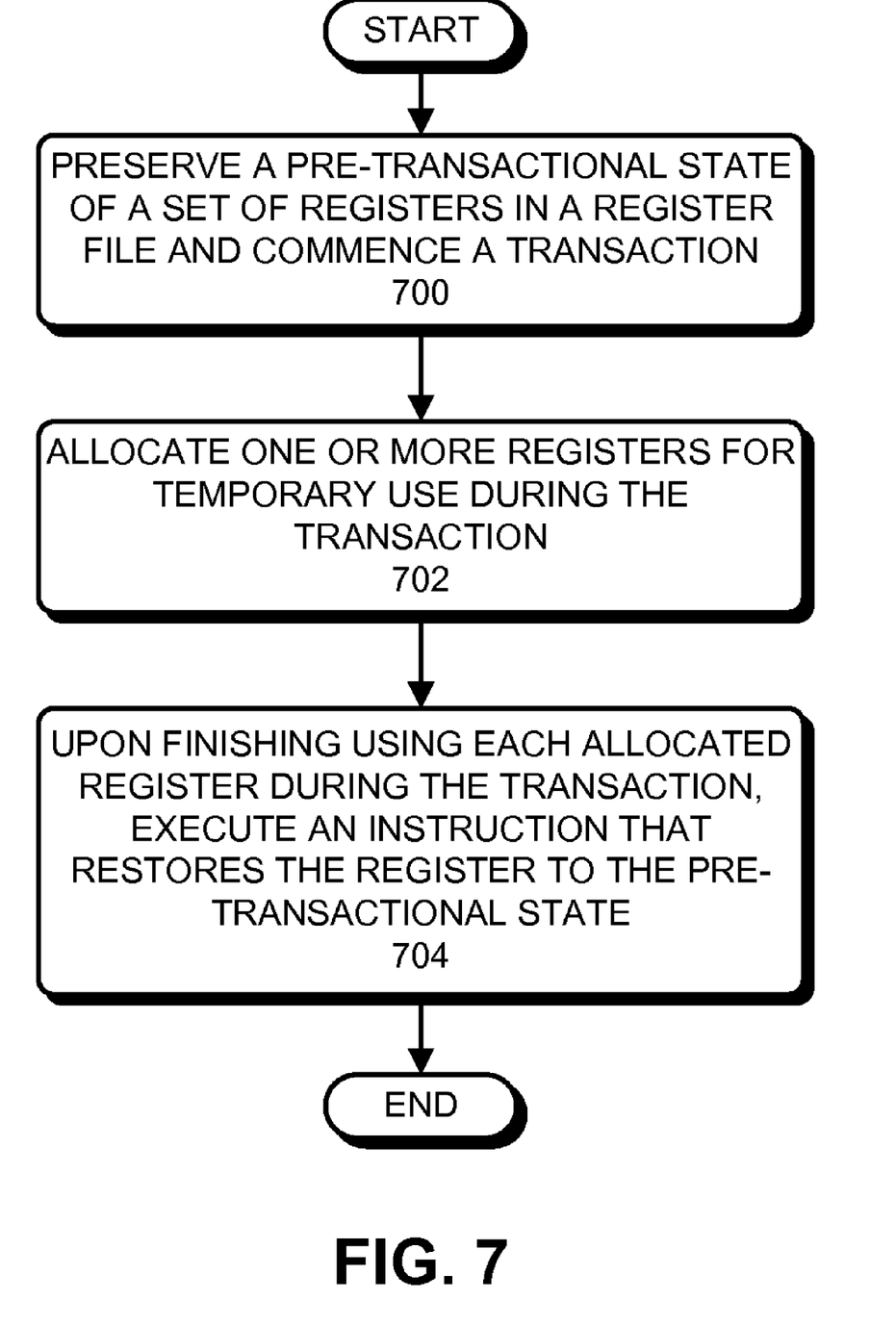
FIG. 7 presents a flowchart illustrating the process of restoring a register in accordance with embodiments of the present invention.

FIG. 7 presents a flowchart illustrating the process of restoring a register in accordance with embodiments of the present invention. The process starts when processor 202 (see FIG. 2) encounters a transaction. Recall that we use the terms "transaction" and "pre-transactional state" throughout the disclosure and in the claims to describe regions of program code where original data for one or more registers has been preserved, facilitating the use of a restoring instruction for a given register.

Processor 202 then preserves a pre-transactional state of a set of registers in a register file and commences the transaction (step 700). For example, preserving the pre-transactional state of a set of processor registers can involve: (1) saving the data in a register file into a second copy of the register file and using the original copy of the register file during the transaction or (2) switching to a second copy of the register file for writing transactional data, wherein the original copy of the register file maintains the pre-transactional data.

Next, processor 202 allocates one or more registers for temporary use during the transaction (step 702). Processor 202 can then freely store data to and read data from the allocated registers. In some embodiments of the present invention, the register that is allocated is a register that is ordinarily not allowed to be allocated. For example, in some embodiments of the present invention, processor 202 can allocate a control register or another register that is typically not allocated (e.g., according to a software or hardware convention).

Processor 202 then executes an instruction for each allocated register that restores the register to the pre-transactional state upon finishing using each allocated register during the transaction (step 704).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclo-

What is claimed is:

1. A method for allocating registers in a processor, comprising:
commencing a transaction, wherein commencing the transaction involves preserving a pre-transactional state of registers in a first register file by switching to a second register file as the transaction commences and subsequently using the second register file during the transaction;
asserting a modified bit for each register in the second register file which is written to during the transaction;
allocating a single register in the first register file for temporary use during the transaction; and
upon finishing using the allocated register during the transaction, executing an instruction that restores the allocated register to the pre-transactional state by clearing the modified bit for the register.

2. The method of claim 1, wherein allocating a register involves allocating an integer register, and wherein executing the instruction that restores the allocated register to the pre-transactional state involves executing a REWIND instruction.

3. The method of claim 1, wherein allocating a register involves allocating a floating-point register, and wherein executing the instruction that restores the allocated register to the pre-transactional state involves executing a FREWIND instruction.

4. The method of claim 1, wherein preserving the pre-transactional state of the registers in the first register file involves copying the data from the registers in the first register file to corresponding registers in a second register file and using the registers in the first register file during the transaction; and
wherein restoring an allocated register involves copying the data for the allocated register from the second register file to the first register file.

5. The method of claim 1, wherein the method further comprises upon completing the transaction, setting an architectural register indicator associated with each register which has a modified bit set so that the register is used as an architectural copy of the register during subsequent execution.

6. The method of claim 1, wherein the registers that are to be restored to the pre-transactional state include at least one special-purpose register or general-purpose register.

7. The method of claim 1, wherein the single register is a register that would not be available for allocation for temporary use during the transaction without using the instruction to restore the pre-transactional state during the transaction.

8. The method of claim 7, wherein the register is a register that is constrained by an application binary interface (ABI) that identifies a function performed by a special purpose register.

9. A computer-readable storage medium containing an instruction that when executed causes a processor to restore preserved pre-transactional data to a single register that was temporarily allocated during a transaction, wherein the single register is a register that would not be available for allocation for temporary use during the transaction without using the instruction to restore the pre-transactional state during the transaction,
wherein commencing the transaction involves preserving a pre-transactional state of registers in a first register file by switching to a second register file and subsequently using the second register file during the transaction, wherein during the transaction the processor asserts a modified bit for each register in the second register file which is written to during the transaction, and wherein restoring the preserved pre-transactional data to the single register comprises clearing the modified bit for the register.

10. The computer-readable storage medium of claim 9, wherein the register is a non-floating-point register and the instruction is a REWIND instruction.

11. The computer-readable storage medium of claim 9, wherein the register is a floating-point register and the instruction is a FREWIND instruction.

12. A computer-readable storage medium containing instructions that when executed cause a processor to perform a method for allocating registers in a processor, the method comprising:
commencing a transaction, wherein commencing the transaction involves preserving a pre-transactional state of registers in a first register file by switching to a second register file as the transaction commences and subsequently using the second register file during the transaction;
asserting a modified bit for each register in the second register file which is written to during the transaction;
allocating a single register in the first register file for temporary use during the transaction; and
upon finishing using the allocated register during the transaction, executing an instruction that restores the allocated register to the pre-transactional state by clearing the modified bit for the register.

13. The computer-readable storage medium of claim 12, wherein allocating a register involves allocating an integer register, and wherein executing the instruction that restores the allocated register to the pre-transactional state involves executing a REWIND instruction.

14. The computer-readable storage medium of claim 12, wherein allocating a register involves allocating a floating-point register, and wherein executing the instruction that restores the allocated register to the pre-transactional state involves executing a FREWIND instruction.

15. The computer-readable storage medium of claim 12, wherein preserving the pre-transactional state of the registers in the first register file involves copying the data from the registers in the first register file to corresponding registers in a second register file and using the registers in the first register file during the transaction; and
wherein restoring an allocated register involves copying the data for the allocated register from the second register file to the first register file.

16. The computer-readable storage medium of claim 12, wherein the method further comprises upon completing the transaction, setting an architectural register indicator associated with each register which has a modified bit set so that the register is used as an architectural copy of the register during subsequent execution.

17. The computer-readable storage medium of claim 12, wherein the registers that are to be restored to the pre-transactional state include at least one special-purpose register or general-purpose register.

18. A computer system including a processor, wherein the processor executes instructions that cause the processor to perform a method for allocating registers in a processor, the method comprising:
commencing a transaction, wherein commencing the transaction involves preserving a pre-transactional state of registers in a first register file by switching to a second register file as the transaction commences and subsequently using the second register file during the transaction;

asserting a modified bit for each register in the second register file which is written to during the transaction;

allocating a single register in the first register file for temporary use during the transaction; and upon finishing using the allocated register at least once during the transaction, executing an instruction that restores the allocated register to the pre-transactional state by clearing the modified bit for the register.

19. The computer system of claim 18, wherein allocating a register involves allocating an integer register, and wherein executing the instruction that restores the allocated register to the pre-transactional state involves executing a REWIND instruction.

20. The computer system of claim 18, wherein allocating a register involves allocating a floating-point register, and wherein executing the instruction that restores the allocated register to the pre-transactional state involves executing a FREWIND instruction.

21. The computer system of claim 18, wherein preserving the pre-transactional state of the registers in the first register file involves copying the data from the registers in the first register file to corresponding registers in a second register file and using the registers in the first register file during the transaction; and wherein restoring an allocated register involves copying the data for the allocated register from the second register file to the first register file.

22. The computer system of claim 18, wherein the method further comprises upon completing the transaction, setting an architectural register indicator associated with each register which has a modified bit set so that the register is used as an architectural copy of the register during subsequent execution.

23. The computer system of claim 18, wherein the registers that are to be restored to the pre-transactional state include at least one special-purpose register or general-purpose register.

* * * * *